US009347390B2

(12) United States Patent
Glugla et al.

(10) Patent No.: US 9,347,390 B2
(45) Date of Patent: May 24, 2016

(54) ENGINE DE-CHOKING IN RESPONSE TO AN ENGINE FLOOD EVENT

(71) Applicant: Ford Global Technologies, LLC, Dearborn, MI (US)

(72) Inventors: Chris Paul Glugla, Macomb, MI (US); Michael Damian Czekala, Canton, MI (US); Michael Howard Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 473 days.

(21) Appl. No.: 13/847,593

(22) Filed: Mar. 20, 2013

(65) Prior Publication Data
US 2014/0288808 A1 Sep. 25, 2014

(51) Int. Cl.
F02D 9/02 (2006.01)
F02D 41/06 (2006.01)
F02D 33/00 (2006.01)
F02D 41/00 (2006.01)
F02N 11/08 (2006.01)
F02N 19/00 (2010.01)
F02N 11/00 (2006.01)

(52) U.S. Cl.
CPC .......... F02D 33/006 (2013.01); F02D 41/0002 (2013.01); F02D 41/062 (2013.01); F02D 41/067 (2013.01); F02N 11/0825 (2013.01); F02D 2009/025 (2013.01); F02D 2009/0205 (2013.01); F02N 11/00 (2013.01); F02N 11/0848 (2013.01); F02N 2019/002 (2013.01); F02N 2200/02 (2013.01); F02N 2250/06 (2013.01); Y10S 903/905 (2013.01)

(58) Field of Classification Search
CPC .................. F02D 2009/0205; F02D 2009/025; F02D 2009/0252; F02D 2001/167; F02D 2001/0075; F02D 33/006; F02D 41/067; F02D 41/065; F02D 41/061; F02D 41/062; F02D 41/064; F02M 1/12; F02M 1/02; F02M 1/08
USPC .......... 123/179.18, 179.16, 198 DB, 491, 16; 701/102
See application file for complete search history.

(56) References Cited

U.S. PATENT DOCUMENTS

| 3,628,510 A | * | 12/1971 | Moulds et al. ..................... 123/2 |
| 3,683,871 A | * | 8/1972 | Barr et al. ..................... 123/491 |
| 4,148,282 A | * | 4/1979 | Grassle et al. ............... 123/491 |
| 4,284,053 A | * | 8/1981 | Merrick ........................ 123/497 |
| 4,538,573 A | * | 9/1985 | Merrick ..................... 123/406.5 |
| 4,691,680 A | | 9/1987 | Staerzl |
| 5,009,211 A | * | 4/1991 | Kushida et al. ............... 123/491 |
| 5,012,780 A | * | 5/1991 | Bugamelli ..................... 123/478 |
| 5,076,238 A | | 12/1991 | Rosenau et al. |
| 5,103,781 A | * | 4/1992 | Scott et al. ............... 123/179.18 |
| 5,261,382 A | * | 11/1993 | Nikolai .......................... 123/680 |

(Continued)

FOREIGN PATENT DOCUMENTS

GB 386704 * 1/1933

Primary Examiner — Lindsay Low
Assistant Examiner — George Jin
(74) Attorney, Agent, or Firm — Julia Voutyras; Alleman Hall McCoy Russell & Tuttle LLP

(57) ABSTRACT

A method may comprise automatically de-choking an engine and cranking the engine in response to an engine flood event, wherein automatically de-choking the engine comprises automatically cutting fuel to the engine while opening an air intake throttle.

14 Claims, 6 Drawing Sheets

(56) References Cited

U.S. PATENT DOCUMENTS

| | | | |
|---|---|---|---|
| 5,408,975 A * | 4/1995 | Blakeslee et al. | 123/491 |
| 6,535,811 B1 * | 3/2003 | Rowland | F02D 41/2422 |
| | | | 701/115 |
| 6,848,405 B1 * | 2/2005 | Dow et al. | 123/179.18 |
| 6,931,840 B2 * | 8/2005 | Strayer et al. | 60/285 |
| 7,040,296 B2 * | 5/2006 | Lee | 123/487 |
| 7,246,591 B2 * | 7/2007 | Shinogi et al. | 123/179.18 |
| 7,866,303 B2 | 1/2011 | Storhok et al. | |
| 8,219,305 B2 * | 7/2012 | Iwata et al. | 701/113 |
| 2007/0028881 A1 * | 2/2007 | Nakata et al. | 123/179.15 |
| 2007/0151544 A1 * | 7/2007 | Arai | F02D 11/10 |
| | | | 123/376 |
| 2011/0288746 A1 * | 11/2011 | Carr et al. | 701/103 |
| 2012/0010045 A1 | 1/2012 | Nedorezov et al. | |

\* cited by examiner

ENGINE DE-CHOKING IN RESPONSE TO AN ENGINE FLOOD EVENT

FIELD

The present disclosure relates to methods and systems for automatically de-choking an engine.

BACKGROUND AND SUMMARY

Internal combustion engines with conventional or computer-controlled engine starting systems can stall or fail to start under certain conditions. For example, after multiple engine start attempts, an engine may become flooded with fuel. A flooded engine may be manually started by fully depressing the accelerator pedal to shut off the fuel injectors while the engine is cranking. However, if a vehicle operator is not familiar with this manual procedure for starting a flooded engine, the vehicle operator may not be able to start the engine.

Various approaches have been developed for reducing engine flooding and/or for improving engine startability of a flooded engine. For example, Nakata et. al. (US Patent Application 2007/0028881) describes measuring crank duration via the number of engine revolutions during cranking, and stopping supply of supplementary fuel to the engine when the number of engine revolutions during cranking exceeds a prescribed number of engine revolutions. Accordingly, an excessive amount of fuel is not supplied to the engine thereby reducing the risk of engine flooding and increasing the possibility of subsequently starting the engine successfully by engine cranking.

The inventors herein have recognized issues with the above approaches. Namely, although supplementary fuel to the engine is stopped, fuel is still supplied to the engine when the crank duration exceeds the prescribed crank duration from a primary fuel supply source. Furthermore, if the engine floods, the vehicle driver must be familiar with manual procedures for starting a flooded engine in order to be able to operate the vehicle.

One approach that at least partially addresses the above issues comprises a method of automatically de-choking an engine and cranking the engine in response to an engine flood event. Automatically de-choking the engine may comprise cutting fuel to the engine while opening an air intake throttle, adjusting the air-fuel ratio to a de-choking air-fuel ratio, and/or extending a cranking duration to increase purging of fuel from the engine. In this manner, a method for de-choking and starting an engine may be automatically performed in response to an engine flood event, thereby increasing engine startability, even when a vehicle driver is unfamiliar with manual procedures for starting a flooded engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
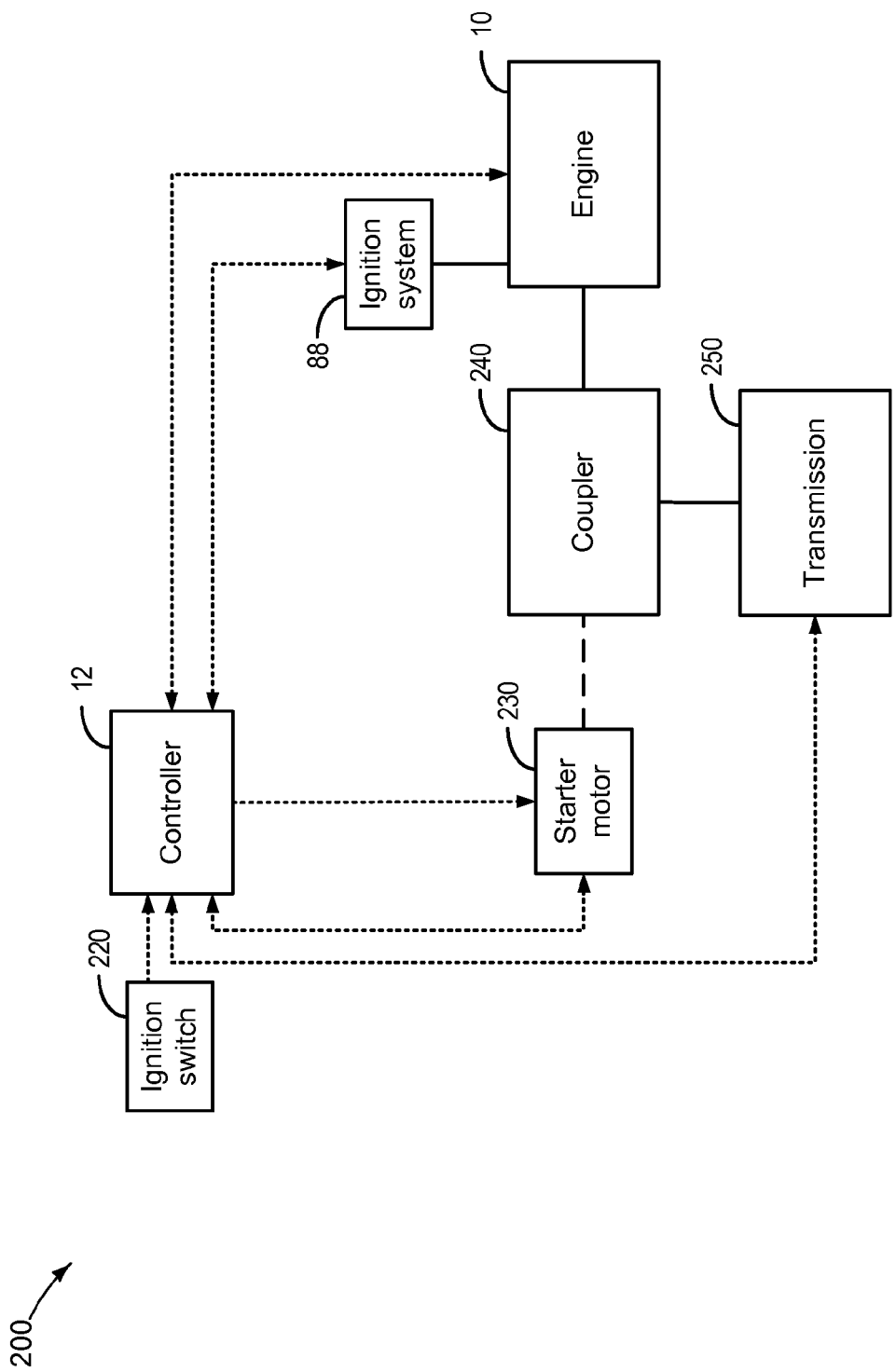
FIG. 2 shows a schematic of an example vehicle starting system.
Figure 3:
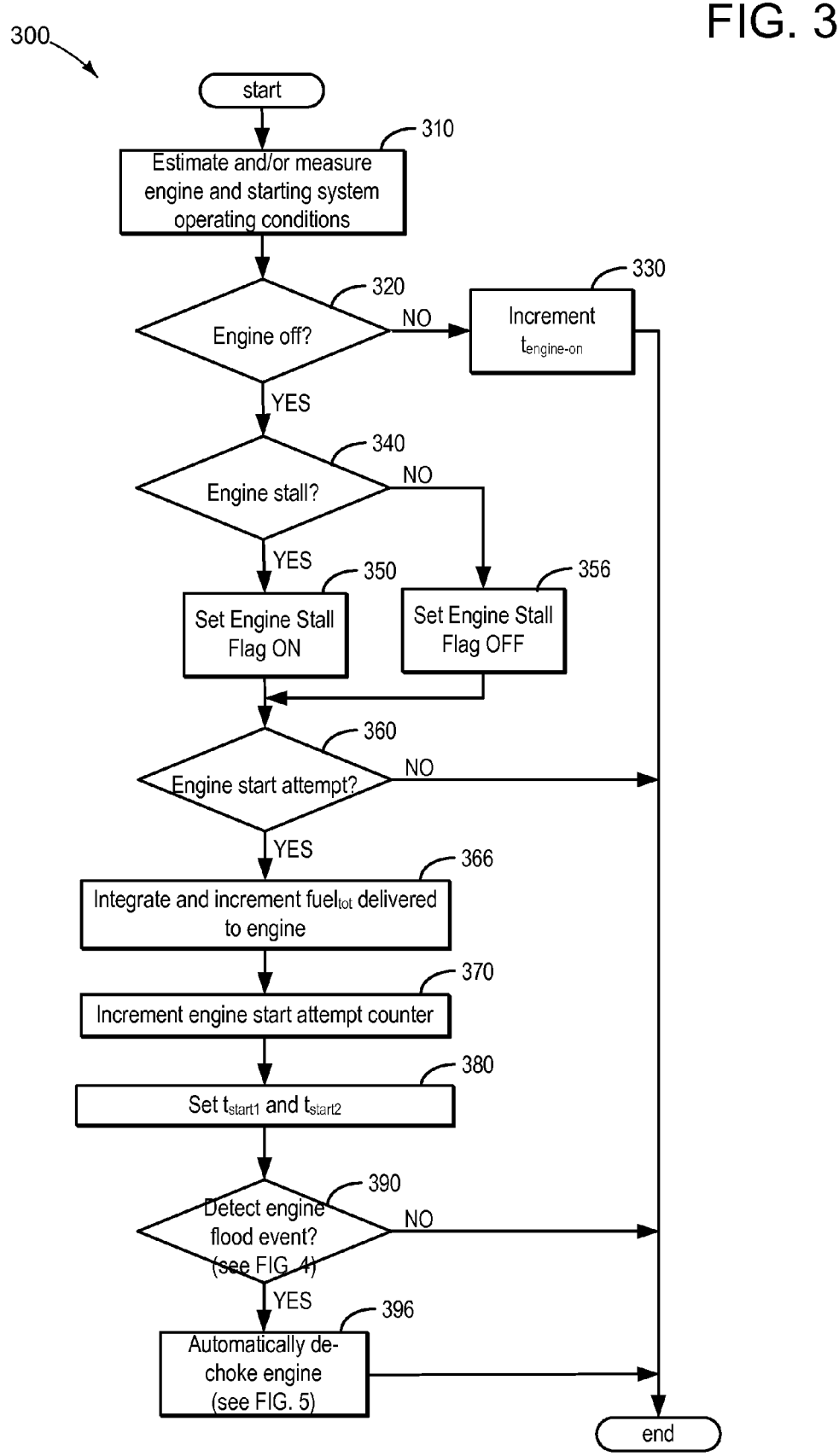
FIG. 3 shows a flow chart of an example method for automatically de-choking an engine.
Figure 4:
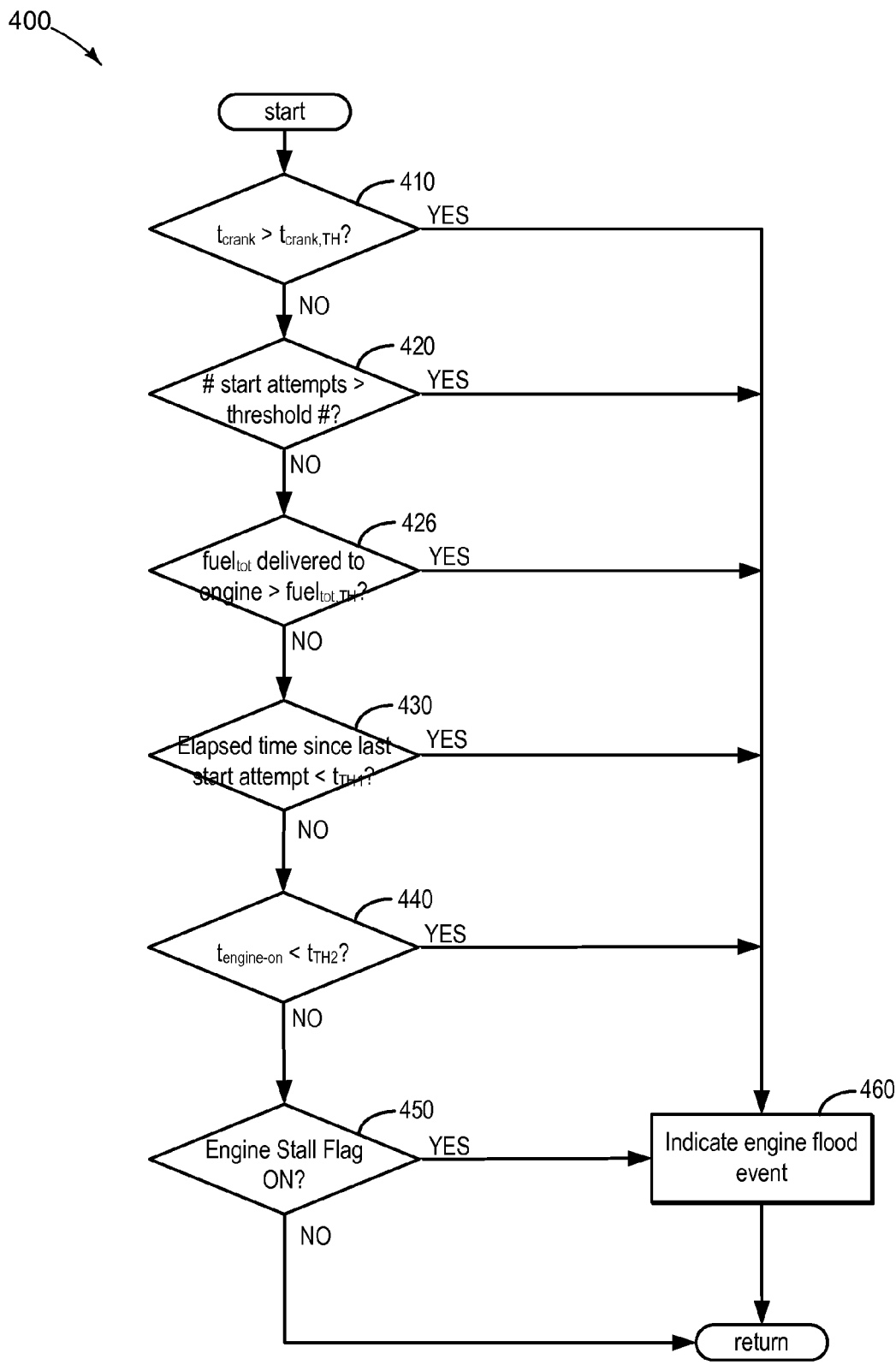
FIG. 4 shows a flow chart of an example method for detecting an engine flood event.
Figure 5:
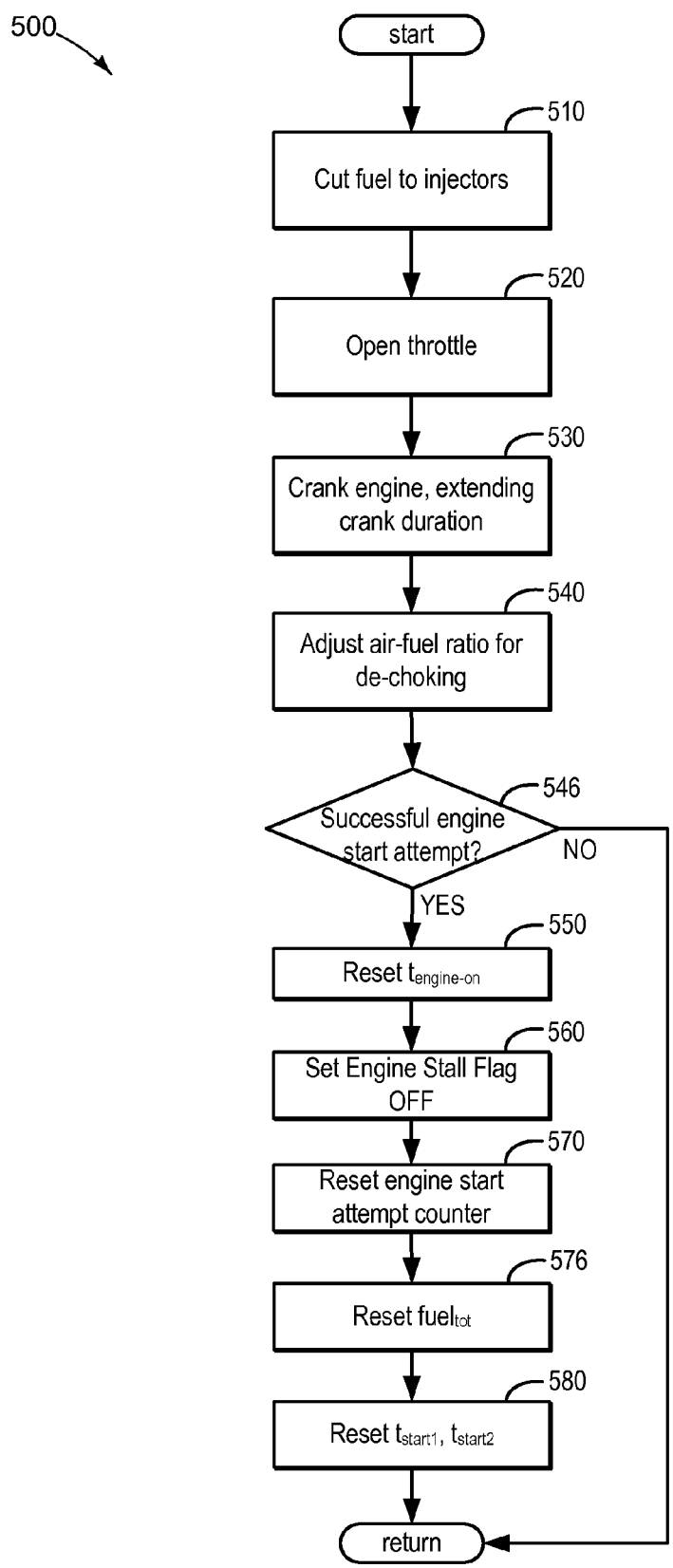
FIG. 5 shows a flow chart of an example method for de-choking an engine.
Figure 6:
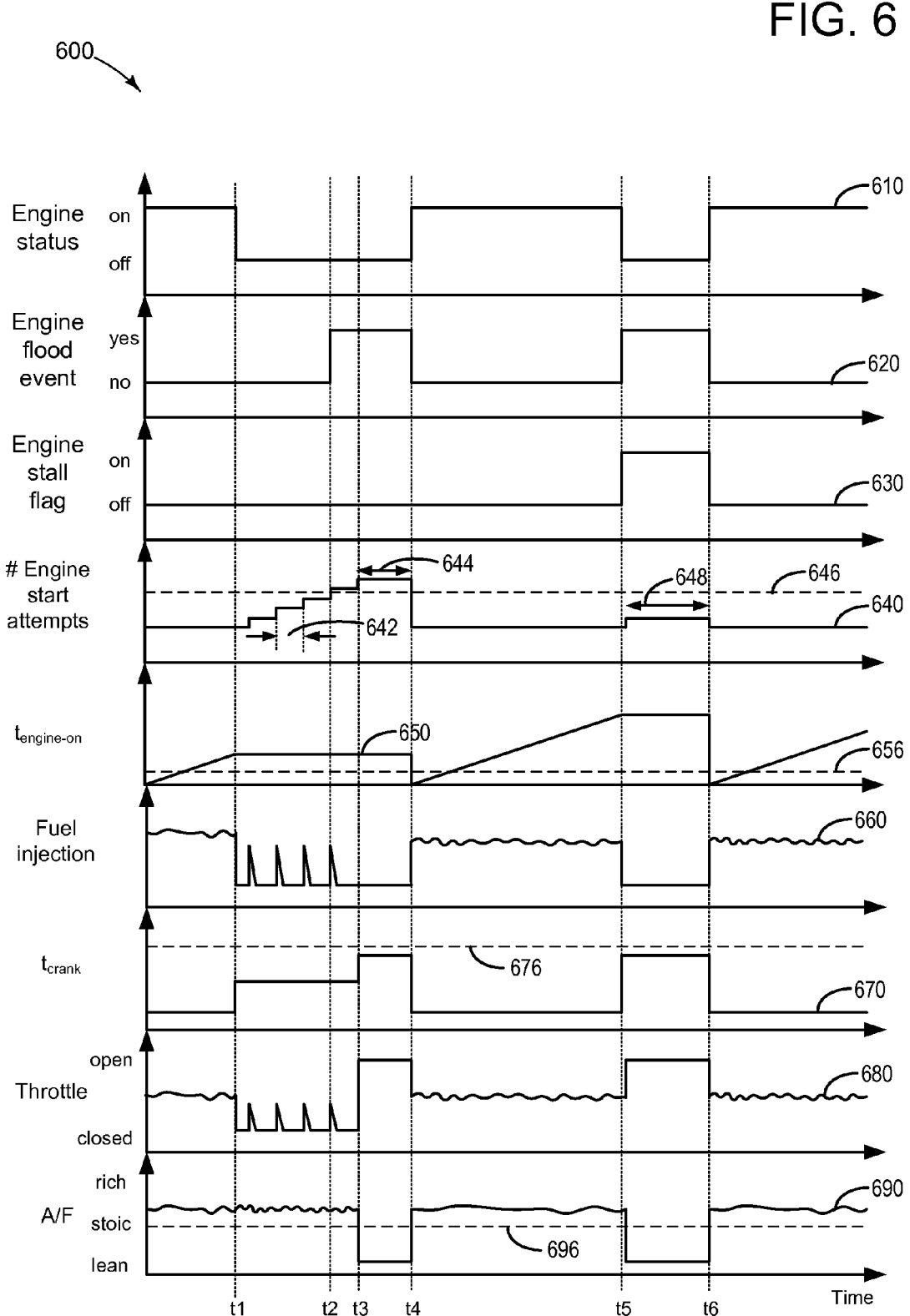
FIG. 6 shows a timeline illustrating engine and starting system conditions.

The following description relates to methods and systems for automatically de-choking an engine in response to an engine flood event. The methods and systems may be applied to an engine, exemplified in FIG. 1, of a hybrid or non-hybrid vehicle system. The engine may comprise a computer-controlled or conventional engine starting system, as illustrated in FIG. 2. FIGS. 3-5 illustrate example methods of automatically de-choking an engine in response to an engine flood event, and detecting an engine flood event. Variations in engine and vehicle starting system conditions while de-choking the engine in response to various engine flood events are illustrated in FIG. 6.

Figure 1:
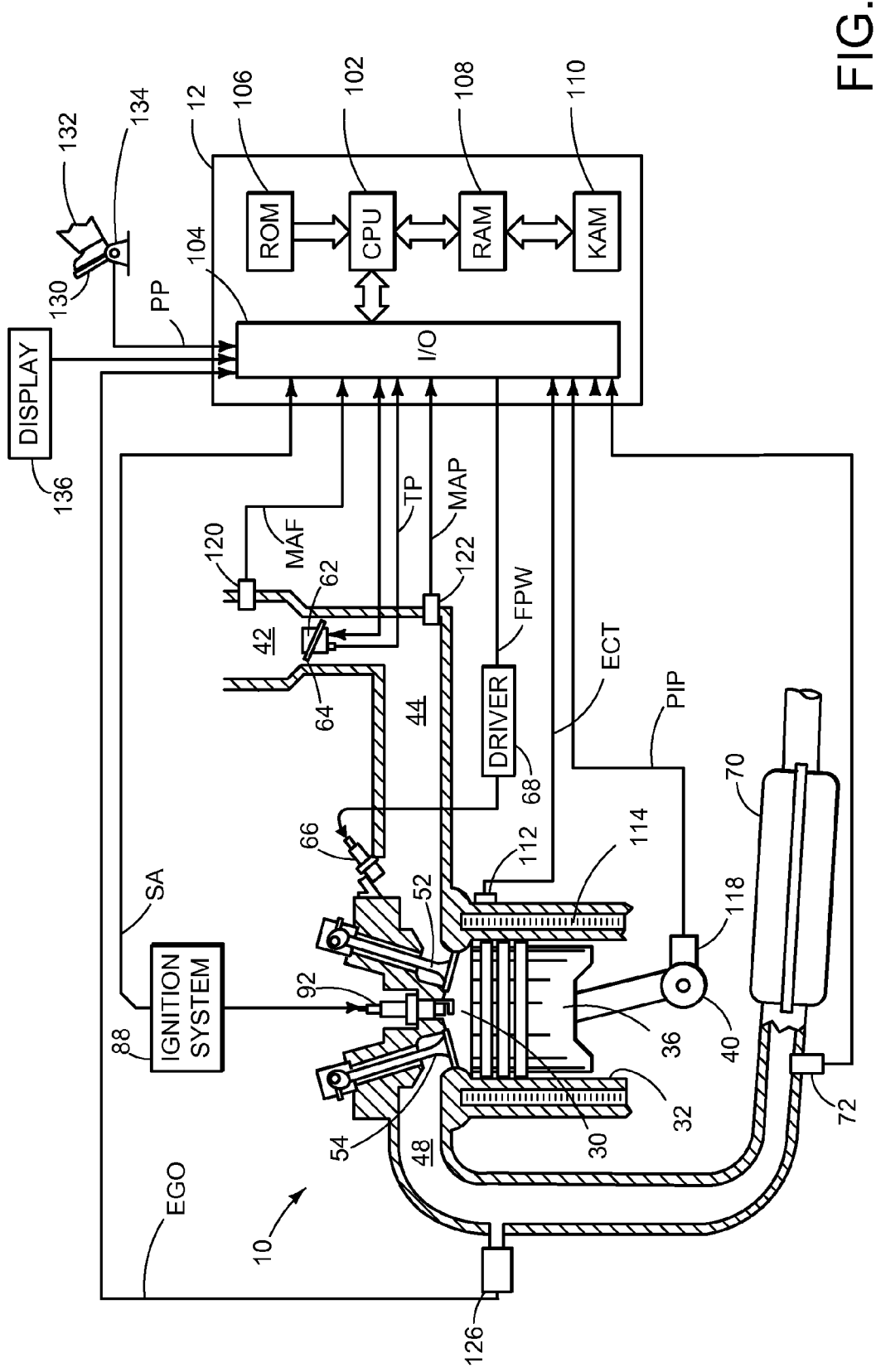
FIG. 1 shows a schematic diagram of an example cylinder of a multi-cylinder engine with an emission control device coupled to the engine exhaust system.

Turning to FIG. 1, a schematic diagram showing one cylinder of multi-cylinder engine 10, which may be included in a propulsion system of a vehicle, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10 (see FIG. 2).

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection. Although FIG. 1 depicts a fuel-injected engine, engine 10 may also comprise a carbureted engine.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio. Other sensors 72 such as an AM and/or a temperature sensor may be disposed upstream of emission control device 70 to monitor the AM and temperature of the exhaust gas entering the emission control device. The sensor locations shown in FIG. 1 are just one example of various possible configurations. For example, the emission control system may include a partial volume set-up with close coupled catalysts.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; AM and/or temperature of the exhaust gas entering the catalyst from sensor 72; exhaust gas air to fuel ratio from sensor 76; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Additionally, controller 12 may communicate with a cluster display device 136, for example to alert the driver of faults in the engine or exhaust after-treatment system.

Storage medium read-only memory 106 can be programmed with computer readable data representing instructions executable by microprocessor unit 102 for performing the methods described below as well as other variants that are anticipated but not specifically listed.

Turning now to FIG. 2, it illustrates a schematic of an example starting system 200 comprising engine 10, controller 12, and ignition system 88. Controller 12 may send and receive signals from engine 10 and transmission 250, and may also receive signals from ignition switch 220, and output signals to ignition system 88 and starter motor 230. Ignition switch 220 may comprise a key ignition switch, or a push button ignition switch for starting the engine. As an example, the ignition switch may be set to various positions such as OFF, ON, and START by manually turning the key to the OFF, ON, and START positions. As a further example, a push button ignition switch may be toggled between OFF, ON, and START when the button is depressed.

Upon activation of the ignition switch 220 to the START position, a connection of an electrical power source such as a battery to the starter motor 230 for starting the engine 10 may be initiated, a signal may be sent to controller 12, and controller 12 may output a signal to drive starter motor 230 for cranking engine 10. Starter motor 230 may crank engine 10 by engaging coupler 240. Coupler 240 may be a flexplate or a flywheel or another coupling device that may mechanically couple starter motor 230 to engine 10. Coupler 240 may further mechanically couple transmission 250 to engine 10.

During starting of engine 10 when the ignition switch is in the START position, starter motor 230 may engage with coupler 240 for cranking engine 10. During engine starting, controller 12 may also control ignition system 88 for providing a spark ignition to engine 10 via engine sparkplugs. Controller 12 may further regulate spark timing of ignition system 88 to coincide with the engine cranking. Furthermore, during engine starting, controller 12 may send and receive information such as crank duration, starter motor rpm, number of engine start attempts (e.g., number of ignition switches) from ignition switch 220, ignition system 88, and starter motor 230. Controller 12 may also store data related to engine starting such as the number of engine start attempts, the time of and elapsed time since the last start attempt, the engine running time since the last start attempt.

After engine 10 is started and/or when cranking is completed, the ignition switch may be set to the ON position, and starter motor 230 may disengage from coupler 240. After engine 10 is started and while the ignition switch is in the ON position, engine 10 may remain coupled via coupler 240 to transmission 250 for driving rotation of the vehicle wheels, as an example. While the engine is ON, controller 12 may communicate with transmission 250 and engine 10 for controlling vehicle speed and power output to the vehicle wheels via transmission 250.

Controller 12 may also store information relating to engine stalls such as the time of and elapsed time since the last engine stall, and may set an Engine Stall Flag to ON if the engine stalls. Further still, an operator indication may be provided, for example via cluster display device 136, if the engine stalls and/or if the Engine Stall Flag is set to ON. For example, the controller may detect an engine stall when the engine status changes from ON to OFF while the ignition switch is in the ON position. When the ignition switch is manually returned to the OFF position, the engine status may be switched to OFF. In order to maintain vehicle driveability and vehicle operability, controller 12 may restrict manually changing the ignition switch to the OFF position when the transmission is not engaged in park or neutral, as an example. Thus, as a further example, an engine stall may be detected if the engine status switches from ON to OFF when the transmission is not engaged in park or neutral. An engine stall may comprise an abrupt ceasing of engine operation for various reasons including improper air-fuel ratio, malfunctioning electric sparking, mechanical failures, and drastic changes in engine load (e.g., when a clutch is released suddenly in manual transmission). Because of the abrupt change in engine operation brought about by an engine stall, residual excess uncombusted fuel may remain in the engine cylinders, causing an engine flood event.

With reference to FIG. 3, it illustrates a method 300 of automatically de-choking an engine in response to an engine flood event. Accordingly, method 300 may increase the engine startability after an engine flood event, and when an operator is unfamiliar with manual de-choking procedures for starting a flooded engine. Method 300 begins at 310 where engine and starting system operating conditions such as engine status, engine torque, engine speed, and engine-on time are estimated and/or measured. Starting system conditions including engine stall flag, elapsed time since last engine start attempt, number of engine start attempts, and crank duration may also be estimated and/or measured. At 320, method 300 determines the engine status. If the engine is on, method 300 continues at 330 where the engine-on time, $t_{engine\text{-}on}$ is incremented. Engine-on time, $t_{engine\text{-}on}$, may provide an indication of engine-on time until an engine status is switched off. After 330, method 300 ends.

Returning to 320, if the engine is off, then method 300 continues at 340 where it is determined if the engine has stalled. For example, if the engine status switches from ON to OFF while the ignition switch is in the ON position, an engine stall may be detected and an Engine Stall Flag may be set to ON at 350. Otherwise, if an engine stall is not detected, the Engine Stall Flag is set OFF at 356. Following 350 and 356, method 300 continues at 360 where it is determined if an engine start attempt is made. As an example, an engine start attempt may be indicated if the ignition switch is changed from the OFF position to the START position. If there is no engine start attempt at 360, method 300 ends.

Next, at 366, an amount or mass of fuel delivered to the engine during the engine start attempt may be determined, for example, by integrating the fuel injection pulse widths, correcting if desired for temperature and altitude. The total amount of fuel delivered during successive engine start attempts since the last successful engine start may then be computed by incrementing a total amount or mass of fuel, $fuel_{tot}$, by the integrated amount of fuel during the most recent engine start attempt. Furthermore, an engine start attempt counter may be incremented at 370, and the current and previous engine start attempt times, $t_{start1}$ and $t_{start2}$, respectively, are set at 380. As an example, when an engine start attempt is made, $t_{start2}$ is set to $t_{start1}$, and then $t_{start1}$ is set corresponding to the most recent start attempt. Following 380, method 300 continues at 390 where an engine flood event is detected.

Turning now to FIG. 4, it illustrates a flow chart for a method 400 of detecting an engine flood event. An engine flood event may be indicated by crank duration, the number of consecutive start attempts, the elapsed time since the last start attempt, the engine running time prior to the start attempt, and the engine stall flag. Method 400 begins at 410, where it determines if a crank duration, $t_{crank}$ is greater than a threshold crank duration, $t_{crank,TH}$. Crank duration may be indicated by measuring the duration when an engine is cranking (e.g., when the ignition switch is set to START and the starter motor 230 is coupled to the coupler 240), by measuring the starter motor or engine revolutions during cranking, or by a combination thereof. If $t_{crank}$ is greater than $t_{crank,TH}$, the cranking duration is longer than an average cranking duration for starting the engine, and an engine flood event may be indicated at 460. For example, when the cranking duration is extended beyond $t_{crank,TH}$, there may be an excess of uncombusted fuel injected at the engine cylinders and the engine may be flooded.

If $t_{crank}$ is not greater than $t_{crank,TH}$ then method 400 continues at 420 where it is determined if the number of engine start attempts is greater than a threshold number of engine start attempts. The number of engine start attempts may be stored in an engine start attempt counter, and may indicate the number of consecutive engine start attempts prior to a successful engine start. If the number of engine start attempts is greater than a threshold number of engine start attempts, then an engine flood event may be indicated at 460. For example, when the number of engine start attempts is greater than a threshold number of engine start attempts, there may be an excess of uncombusted fuel injected at the engine cylinders and the engine may be flooded.

If the number of engine start attempts is not greater than a threshold number of engine start attempts, method 400 continues at 426 where it may determine if the total amount or mass of fuel delivered to the engine during the engine start attempts exceeds a predetermined amount. The total amount or mass of fuel, $fuel_{tot}$, may be determined, for example, by integrating the fuel injection pulse widths, correcting if desired for temperature and altitude, and comparing the delivered fuel amount to a predetermined amount. For example, if the $fuel_{tot}$ delivered during the start attempts is greater than a threshold amount of fuel, $fuel_{tot,TH}$, an engine flood event may be indicated.

If $fuel_{tot}$ is not greater than a $fuel_{tot,TH}$, method 400 continues at 430 where it is determined if the elapsed time since the last start attempt is less than a first threshold time, $t_{TH1}$. The elapsed time may be determined by measuring a difference in the current and previous engine start attempt times, $t_{start1}$ and $t_{start2}$, respectively. For example, if the difference between $t_{start1}$ and $t_{start2}$ is less than $t_{TH1}$, then there may be an excess of uncombusted fuel injected at the engine cylinders and indication of an engine flood event may be indicated at 460. If the difference between $t_{start1}$ and $t_{start2}$ is not less than $t_{TH1}$, then enough of the residual uncombusted fuel arising from the previous engine start attempt at $t_{start2}$ may have evaporated prior to $t_{start1}$ to avoid an engine flood event.

If the difference between $t_{start1}$ and $t_{start2}$ is not less than $t_{TH1}$, then method 400 continues at 440, where it is determined if the engine-on time, $t_{engine\text{-}on}$ prior to the last engine start is less than a second threshold time, $t_{TH2}$. For example, if $t_{engine\text{-}on}$ is less than $t_{TH2}$, then there may be an excess of uncombusted fuel injected at the engine cylinders and indication of an engine flood event may be indicated at 460. If $t_{engine\text{-}on}$ is greater than $t_{TH2}$ then residual uncombusted fuel in the engine may be combusted and method 400 continues at 450.

At 450, method 400 determines if the Engine Stall Flag is ON. If the Engine Stall Flag is ON, then the engine may have stalled. An engine stall may comprise an abrupt ceasing of engine operation for various reasons including improper air-fuel ratio, malfunctioning electric sparking, mechanical failures, and drastic changes in engine load (e.g., when a clutch is released suddenly in manual transmission). Because of the abrupt change in engine operation brought about by an engine stall, residual excess uncombusted fuel may remain in the engine cylinders, causing an engine flood event. Accordingly, if the Engine Stall Flag is ON at 450, method 400 provides an indication of an engine flood event at 460.

If the Engine Stall Flag is OFF, method 400 returns to method 300 at 390. Returning to 390 if an engine flood event is not detected, method 300 ends. Otherwise, if an engine flood event is detected, method 300 continues at 396 where the engine is automatically de-choked in response to the engine flood event.

Turning now to FIG. 5, it illustrates a method 500 of automatically de-choking an engine. Method 500 begins at 510 where fuel is cut to the engine fuel injectors. As an example, fuel injectors 66 coupled to engine cylinder intake or directly to engine cylinders may be shut off or closed by controller 12 automatically. Cutting the engine fuel injectors stops additional fuel from being injected into the engine cylinders during de-choking and may mitigate engine flooding.

Next, method 500 continues at 520 where the engine air intake throttle is opened. As an example, throttle plate 64 may be fully opened or partially opened to allow flow of intake are into the engine and to aid in de-choking the engine. After increasing an opening of the intake air throttle, method 500 continues at 530 where the engine is cranked and the crank duration is extended. Extending the crank duration may aid in de-choking the engine by providing a longer duration for ignition, evaporation, and combustion of residual fuel in the engine cylinders. At 530, method 500 may also initiate spark ignition via ignition system 88 while cranking for the extended crank duration.

Continuing from 530, method 500 proceeds to 540 where automatic de-choking may further comprise adjusting the air-fuel ratio for de-choking. As an example, an air-fuel ratio may be leaner as compared to non-de-choking engine operation since the engine may already be flooded with fuel. Adjusting the air-fuel ratio to a de-choking air-fuel ratio (e.g., a lean air-fuel ratio) may aid in automatically de-choking the engine since the fuel content in the engine cylinders may be reduced, providing a less rich (e.g., leaner) fuel mixture for combustion. Adjusting the air-fuel ratio may be accomplished by one or more of adjusting an intake air throttle, adjusting fuel injection, adjusting cylinder intake and exhaust valve opening overlap, and the like.

Next, method 500 determines at 546 if an engine start attempt is successful. For example, if the engine starts prior to the end of the extended crank duration, then a successful engine start attempt may be indicated. If the engine start attempt is unsuccessful, then method 500 returns to method 300 at 396 after which method 300 ends.

If the engine start attempt is successful, method 500 continues at 550, 560, 570, 576, and 580, where $t_{engine-on}$ is reset, Engine Stall Flag is set to OFF, the engine start attempt counter is reset, $fuel_{tot}$ is reset, and $t_{start1}$ and $t_{start2}$ are reset, respectively. After 580, method 500 returns to method 300 at 396 after which method 300 ends.

In this manner, a method may comprise automatically de-choking an engine and cranking the engine in response to an engine flood event, wherein automatically de-choking the engine may comprise automatically cutting fuel to the engine while increasing an opening of an air intake throttle, and wherein de-choking the engine may further comprise adjusting an air-fuel ratio to a de-choking air-fuel ratio, and extending a cranking duration to increase purging of fuel from the engine. The engine flood event may be detected based on a number of engine start attempts being greater than a threshold number of engine start attempts, a cranking duration being greater than a threshold cranking duration, an elapsed time since a last engine start attempt being less than a first threshold time, an elapsed engine-on time being less than a second threshold time, and/or an amount of fuel delivered to the engine during engine start attempts.

As another example, a method of automatically de-choking an engine may comprise cutting fuel to engine fuel injectors, increasing an opening of an intake air throttle, cranking the engine, and adjusting an air-fuel ratio to a de-choking air-fuel ratio. Cranking the engine may comprise cranking the engine for an extended cranking duration, and automatically de-choking the engine may be performed in response to detecting an engine flood event. Detecting the engine flood event may comprise detecting a crank duration exceeding a threshold crank duration and/or a number of engine start attempts exceeding a threshold number of engine start attempts. Furthermore, detecting the engine flood event may comprise detecting an elapsed time since a last engine start attempt exceeding a first threshold time and/or an elapsed engine running time exceeding a second threshold time. Further still, detecting the engine flood event may comprise detecting an engine stall, and/or detecting a total amount of fuel delivered to the engine during engine start attempts exceeding a threshold amount of fuel.

Turning now to FIG. 6, it illustrates an example timeline showing variations in engine status 610, engine flood event 620, engine stall flag 630, number of engine start attempts 640, engine-on time (e.g. $t_{engine-on}$) 650, fuel injection 660, crank duration (e.g., $t_{crank}$) 670, intake air throttle 680, and air-fuel ratio 690. Also plotted on the timeline is the threshold number of engine start attempts 646, a threshold engine-on time, $t_{engine-on,TH}$ 656, a threshold crank duration, $t_{crank,TH}$ 676, and a stoichiometric air-fuel ratio 696. Prior to t1, the engine status 610 is ON, $t_{engine-on}$ steadily increases, and the fuel injection 660, throttle 680 and air-fuel ratio 690 are controlled to maintain the engine operation.

At t1, the engine may be switched off in response to, for example, the vehicle being parked, or a hybrid vehicle being stopped at an intersection. After t1, a series of unsuccessful engine start attempts are made as illustrated by the incrementing number of engine start attempts 640 and the engine status remaining off. Each engine start attempt has a crank duration 670 equivalent to a first crank duration 642 less than the threshold crank duration 676. During each engine start attempt, the fuel injection flow 660 and air intake throttle 680 are pulsed, to allow fuel and air flow into the engine cylinders. Air-fuel ratio 690 is maintained slightly rich to mitigate high engine temperatures and NOx emissions while the engine is running. Between t1 and t2, $t_{engine-on}$ remains constant since the engine status is OFF.

At t2, the number of engine start attempts 640 exceeds the threshold number of engine start attempts 646, indicating an engine flood event as shown by 620. Alternatively, an engine flood event may be determined by the amount or mass of fuel delivered during the engine start attempts such as by integrating the fuel injection pulse widths, correcting if desired for temperature and altitude, and comparing the delivered fuel amount to a predetermined amount. For example, if the total amount or mass of fuel delivered during the start attempts is greater than a threshold amount of fuel, an engine flood event may be indicated. In response to detecting the engine flood event, an indication may be provided to the operator, for example via a cluster display device 136. Also in response to the engine flood event at t2, de-choking the engine begins at t3, and may comprise cutting fuel injection 660 to the engine, opening air intake throttle 680, extending $t_{crank}$ 670, and adjusting air-fuel ratio to a de-choke air-fuel ratio. As an example, the de-choke air-fuel ratio may be a substantially lean air-fuel ratio in order to aid in purging fuel from the flooded engine. Furthermore, opening the air intake throttle to an increased open position (e.g., fully open or near fully open) as shown at 680 as compared to non-de-choking engine operation may aid in purging fuel from the flooded engine. The extended crank duration at t3, as shown at 670, may be a second crank duration, less than a threshold crank duration 676. As a further example, the extended crank duration during engine de-choking may also be greater than a threshold crank duration 676.

At t4, in response to the de-choking, the engine is successfully started. In response to the engine start, the engine status at 610 is switched to ON, the engine flood event indication at 620 is removed, the number of engine start attempts 640 is reset, $t_{engine-on}$ 650 is reset, and $t_{crank}$ 670 is no longer extended. Between t4 and t5, while the engine is running, $t_{engine-on}$ 650 is steadily incremented, and control of the fuel injection 660, air intake throttle 680, and air-fuel ratio 690 are resumed to maintain the engine ON operation.

Next at t5, an engine stall occurs, for example, in response to an improper air-fuel ratio, malfunctioning electric sparking, mechanical failures, or a drastic changes in engine load (e.g., when a clutch is released suddenly in manual transmission). Because of the abrupt change in engine status 610 from ON to OFF brought about by the engine stall, residual excess uncombusted fuel may remain in the engine cylinders, and an engine flood event 620 is indicated at t5. The engine stall flag 630 is set to ON, and indication thereof may be provided, for example at display device 136, to provide a warning to the operator of the engine stall. In response to the engine stall and concurrent engine flood event, de-choking the engine begins shortly after t5 at the next engine start attempt at 640. As described above, de-choking may comprise cutting fuel injection 660 to the engine, opening air intake throttle 680, extending $t_{crank}$ 670, and adjusting air-fuel ratio 690 to a de-choke air-fuel ratio. The extended crank duration at t5, as shown at 670, may be a second crank duration, less than a threshold crank duration 676. As one example, the crank duration at 648 may last longer than at 644 because recovery from an engine flood event due to engine stalling may be slower than recovery from an engine flood event due to the number of engine start attempts 640 exceeding a threshold number of engine start attempts 646.

At t6, in response to the de-choking, the engine is successfully started. In response to the engine start, the engine status 610 is switched to ON, the engine flood event 620 indication is removed, the number of engine start attempts 640 is reset, engine stall flag 630 is set to OFF, $t_{engine-on}$ 650 is reset, and $t_{crank}$ 670 is no longer extended. After t6, while the engine is running, $t_{engine-on}$ 650 is steadily incremented, and control of the fuel injection 660, air intake throttle 680 and air-fuel ratio 690 are resumed to maintain the engine ON operation.

In this manner, a system may comprise an engine, an ignition system, a starter motor coupled to a crankshaft of the engine, and a controller having a computer storage medium with executable instructions encoded thereon. The executable instructions may comprise instructions to cut fuel to engine fuel injectors while opening a throttle and cranking the engine in response to detecting an engine flood event, and instructions to extend a crank duration and adjust an air-fuel ratio for de-choking the engine in response to detecting an engine flood event. The engine may comprise a carbureted engine, or a non-carbureted engine. Furthermore, the engine may comprise a hybrid vehicle engine or a non-hybrid vehicle engine.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Furthermore, the above technology may be applied to a non-carbureted engine, or a carbureted engine. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   automatically de-choking a non-carbureted engine, including automatically cutting fuel to the engine while increasing an air intake throttle opening, and cranking the engine in response to detecting an engine flood event, the engine flood event detected based on an amount of fuel delivered to the engine during engine start attempts.

2. The method of claim 1, wherein detecting an engine flood event further comprises detecting an engine stall.

3. The method of claim 2, wherein de-choking the engine further comprises adjusting an air-fuel ratio to a de-choking air-fuel ratio.

4. The method of claim 2, wherein de-choking the engine further comprises extending a cranking duration to increase purging of fuel from the engine.

5. The method of claim 1, further comprising detecting the engine flood event based on a number of engine start attempts being greater than a threshold number of engine start attempts.

6. The method of claim 1, further comprising detecting the engine flood event based on a cranking duration being greater than a threshold cranking duration.

7. The method of claim 1, further comprising detecting the engine flood event based on an elapsed time since a last engine start attempt being less than a first threshold time.

8. The method of claim 1, further comprising detecting the engine flood event based on an elapsed engine-on time being less than a second threshold time, where elapsed engine-on time indicates an engine-on time until the engine is turned off.

9. A method of automatically de-choking an engine, comprising:

cutting fuel to engine fuel injectors;

increasing an opening of an intake air throttle;

cranking the engine for an extended cranking duration; and adjusting an air-fuel ratio to a de-choking air-fuel ratio, wherein automatically de-choking the engine is performed in response to detecting an engine flood event including detecting an engine stall event.

10. The method of claim 9, wherein the engine stall event is detected based on an abrupt ceasing of engine operation when a transmission is not engaged in park or neutral.

11. The method of claim 9, wherein detecting the engine flood event further comprises detecting a crank duration exceeding a threshold crank duration and/or a number of engine start attempts exceeding a threshold number of engine start attempts.

12. The method of claim 9, wherein detecting the engine flood event comprises detecting an elapsed time since a last engine start attempt exceeding a first threshold time and/or an elapsed engine running time less than a second threshold time.

13. A method of automatically de-choking an engine, comprising:

in response to an engine flooding event based on a total amount of fuel delivered during a start being greater than a threshold:
cutting fuel to engine fuel injectors;
increasing an opening of an intake air throttle;
cranking the engine for a first extended cranking duration; and
adjusting an air-fuel ratio to a de-choking lean air-fuel ratio; and in response to an engine stall event based on an abrupt ceasing of engine operation when a transmission is not engaged in park or neutral:
cutting fuel to engine fuel injectors;
increasing the opening of the intake air throttle;
cranking the engine for a second extended cranking duration longer than the first extended cranking duration; and
adjusting the air-fuel ratio,
wherein automatically de-choking the engine is performed in response to detecting the engine flood event.

14. The method of claim 13, wherein the engine is part of a hybrid system and the engine comprises a non-carbureted engine.

\* \* \* \* \*